(12) United States Patent  
Roberts et al.

(10) Patent No.: US 10,896,599 B1  
(45) Date of Patent: *Jan. 19, 2021

(54) IMMERSIVE VIRTUAL REALITY DETECTION AND ALERTING TECHNOLOGY

(71) Applicant: Alarm.com Incorporated, Tysons, VA (US)

(72) Inventors: Aaron Lee Roberts, Centreville, VA (US); Charles Richard Alpert, Snoqualmie, WA (US); Aaron Eidelman, Tysons, VA (US); Alison Jane Slavin, Falls Church, VA (US)

(73) Assignee: Alarm.com Incorporated, Tysons, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/537,777

(22) Filed: Aug. 12, 2019

Related U.S. Application Data

(63) Continuation of application No. 15/851,704, filed on Dec. 21, 2017, now Pat. No. 10,380,875.

(60) Provisional application No. 62/437,517, filed on Dec. 21, 2016.

(51) Int. Cl.
| | |
|---|---|
| *G08B 27/00* | (2006.01) |
| *G08B 17/10* | (2006.01) |
| *G08B 13/08* | (2006.01) |
| *G08B 3/00* | (2006.01) |
| *G08B 21/02* | (2006.01) |
| *G08B 21/24* | (2006.01) |

(52) U.S. Cl.
CPC .............. *G08B 27/00* (2013.01); *G08B 3/00* (2013.01); *G08B 13/08* (2013.01); *G08B 17/10* (2013.01); *G08B 21/02* (2013.01); *G08B 21/24* (2013.01)

(58) Field of Classification Search
CPC ........ G08B 27/00; G08B 17/10; G08B 21/24; G08B 21/02; G08B 13/08; G08B 3/00
USPC ............................................................ 701/2
See application file for complete search history.

(56) References Cited

U.S. PATENT DOCUMENTS

| | | | |
|---|---|---|---|
| 10,055,887 B1 * | 8/2018 | Gil | H04N 7/183 |
| 2010/0271394 A1 | 10/2010 | Howard | |
| 2015/0154850 A1 | 6/2015 | Fadell | |
| 2016/0140826 A1 | 5/2016 | Sahiholnasab | |

(Continued)

FOREIGN PATENT DOCUMENTS

WO        2010124074        10/2010

*Primary Examiner* — Brian Wilson  
(74) *Attorney, Agent, or Firm* — Fish & Richardson P.C.

(57) ABSTRACT

Methods, systems, and apparatus, including computer programs encoded on a storage device, for alerting a user immersed in a virtual reality environment to the occurrence of an event. In one aspect, a system includes sensors and a monitoring unit. The monitoring unit includes a network interface, a processor, and a storage device that includes instructions to cause the processor to perform operations. The operations include detecting the occurrence of an event at a property, determining that a user who is located at the property is immersed in a virtual reality environment at a time of occurrence of the event at the property, based on determining that the user who is located at the property is immersed in the virtual reality environment at the time of the occurrence of the event, generating an alert notification that is configured to initiate the user's emergence from the virtual reality environment.

20 Claims, 4 Drawing Sheets

(56) References Cited

U.S. PATENT DOCUMENTS

| | | |
|---|---|---|
| 2016/0206207 A1 | 7/2016 | Avila |
| 2017/0205827 A1 | 7/2017 | Rezvani |
| 2017/0337072 A1* | 11/2017 | Fox .................... G06F 11/3438 |
| 2018/0026920 A1 | 1/2018 | Chen |

* cited by examiner

IMMERSIVE VIRTUAL REALITY DETECTION AND ALERTING TECHNOLOGY

CROSS-REFERENCE TO RELATED APPLICATIONS

This application is a continuation of U.S. application Ser. No. 15/851,704, filed Dec. 21, 2017, now allowed, which claims the benefit of U.S. Provisional Patent Application No. 62/437,517 filed Dec. 21, 2016. Both of these prior applications are incorporated by reference in their entirety.

BACKGROUND

The availability and use of virtual reality devices is becoming more prevalent. Such devices are capable of generating an artificial environment that can distract a user of the virtual reality device of events in the real-world.

SUMMARY

The subject matter of the present disclosure is related to techniques for using a monitoring system to transmit event notifications to equipment that is used to create a virtual reality environment. For example, the monitoring system is configured to generate and use specific types of notifications designed get a user of virtual reality equipment to emerge from a virtual reality environment. Equipment that is used to create a virtual reality environment (or virtual reality equipment) can include one or more computers that are used to generate a virtual reality environment including, for example, one or more servers, one or more desktop computers, one or more laptop computers, one or more cameras, a smartphone, a virtual reality headset, or a combination thereof.

In some implementations, upon detection of an event (e.g., a security event, an emergency event, or other type of alarm event), the monitoring system may be configured to automatically transmit a notification to equipment that is used to create a virtual reality environment. Alternatively, in other implementations, upon detection of an event, the monitoring system may be configured to determine whether the user is immersed in a virtual reality environment. Then, if the user is determined to be immersed in a virtual reality environment, the system may transmit a notification to equipment that is used to create the virtual reality experience in an effort to get the user to emerge from the virtual reality environment. Types of notifications include notifications that (i) trigger playback of audio sounds in the VR headset, (ii) display video alerts on the display of the VR headset, (iii) cause the headset to vibrate, (iv) power down the VR headset, (v) instruct a drone to fly over and nudge the user's leg, (vi) instruct a drone to walk (or roll) over and nudge the user's leg, or the like.

According to one innovative aspect of the present disclosure, a monitoring system is disclosed for alerting a user immersed in a VR environment to the occurrence of an event at a property. The monitoring system may include a plurality of sensors located at a property and a monitoring unit that is configured to obtain sensor data generated by one or more of the plurality of sensors located at the property. The monitoring system may include a network interface, one or more processors, and one or more storage devices that include instructions that are operable, when executed by the one or more processors, to cause the one or more processors to perform operations. The operations may include detecting the occurrence of an event at the property, determining, based on the obtained sensor data, that a user who is located at the property is immersed in a virtual reality environment at a time of the occurrence of the event at the property, and based on determining that the user who is located at the property is immersed in the virtual reality environment at the time of the occurrence of the event at the property, generating an alert notification that is configured to initiate the user's emergence from the virtual reality environment Other aspects include corresponding methods, apparatus, and computer programs to perform actions of methods defined by instructions encoded on computer storage devices.

These and other versions may optionally include one or more of the following features. For example, in some implementations, the operations may include transmitting the generated alert notification to the virtual reality device.

In some implementations, the operations may further include determining an importance score for the detected event, determining that the importance score for the detected event satisfies a predetermined threshold, based on determining (i) that the user who is located at the property is immersed in the virtual reality environment and (ii) that the importance score satisfies the predetermined threshold, generating an alert notification that is configured to initiate the user's emergence from the virtual reality environment.

In some implementations, the operations may include transmitting the generated alert notification to the virtual reality device.

In some implementations, the system may further include the virtual reality device that includes a virtual reality headset. In some implementations, the virtual reality headset may include (i) headwear that includes a receiving unit configured to receive a smartphone and (ii) a smartphone.

In some implementations, obtaining sensor data generated by one or more of the plurality of sensors may include detecting sensor data that is generated and broadcast by one or more motion sensors, one or more contact sensors, one or more glass break sensors, one or more biometric sensors, one or more sensors worn by the user, one or more temperature sensors, one or more smoke sensors, or one or more carbon monoxide sensors, and determining, based on the obtained sensor data, that a user is immersed in a virtual reality environment may include determining, based on the detected sensor data that is generated and broadcast by the one or more motion sensors, the one or more contact sensors, the one or more glass break sensors, the one or more biometric sensors, the one or more sensors worn by the user, the one or more temperature sensors, the one or more smoke sensors, or the one or more carbon monoxide sensors, that a user is immersed in a virtual reality environment.

In some implementations, determining, based on the obtained sensor data, that a user who is located at the property is immersed in a virtual reality environment at a time of the occurrence of the event at the property may include determining, based on the obtained sensor data, that (i) the user's location is stationary and (ii) one or more arms of the user and the head of the user is moving.

In some implementations, one or more of the plurality of sensors may include one or more sensors that are located on the user's body. In such implementations, determining, based on the obtained sensor data, that a user who is located at the property is immersed in a virtual reality environment at a time of the occurrence of the event at the property may include determining, based on (i) obtained sensor data that is generated and broadcast by the one or more that are located on the user's body and (ii) the occurrence of the event, that the user is immersed in the virtual reality environment.

In some implementations, the one or more sensors worn by the user may include a biometric sensor or a motion sensor.

In some implementations, determining, based on the obtained sensor data, that a user who is located at the property is immersed in a virtual reality environment at a time of the occurrence of the event at the property may include determining, based on the sensor data that the user resides in a particular portion of a property, determining, based on the sensor data, that the event is occurring within a predetermined distance of the particular portion of the property, and determining that the user is immersed in the virtual reality environment based on the determination that (i) the user is resides in the particular portion of the property and (ii) the event is occurring within the predetermined distance of the particular portion of the property.

In some implementations, generating an alert notification that is configured to initiate the user's emergence from the virtual reality environment may include generating one or more instructions that, when executed by the virtual reality device, instruct the virtual reality device to output an audio message through a speaker of the virtual reality device that notifies the user of the event.

In some implementations, generating an alert notification that is configured to initiate the user's emergence from the virtual reality environment may include generating one or more instructions that, when executed by the virtual reality device, instruct the virtual reality device to display a visual message on a display of the virtual reality device that notifies the user of the event.

In some implementations, generating an alert notification that is configured to initiate the user's emergence from the virtual reality environment may include generating one or more instructions that, when executed by the virtual reality device, instruct the virtual reality device to vibrate.

In some implementations, generating an alert notification that is configured to initiate the user's emergence from the virtual reality environment may include generating one or more instructions that, when executed by the virtual reality device, instruct the virtual reality device to power down.

In some implementations, determining that the transmitted alert notification failed to initiate the user's emergence from the virtual reality environment and in response to determining that the transmitted alert notification failed to initiate the user's emergence from the virtual reality environment, generating one or more instructions that, when executed by the virtual reality device, instruct the virtual reality headset to power down.

In some implementations, detecting the occurrence of an event may include determining, based on an entry of a calendar associated with the user, that the user has an upcoming appointment. In such implementations, generating an alert notification that is configured to initiate the user's emergence from the virtual reality environment may include in response to determining, based on the entry in the calendar associated with the user, that the user has an upcoming appointment, generating an alert notification to initiate the user's emergence from the virtual reality environment.

In some implementations, detecting the occurrence of an event may include determining, based on sensor data generated and broadcast by a smoke detector or temperature sensor, that a fire is occurring at a property. In such implementations, generating an alert notification that is configured to initiate the user's emergence from the virtual reality environment may include in response to determining, based on the sensor data generated and broadcast by the smoke detector or the temperature sensor, that a fire is occurring at the property, generating an alert notification to initiate the user's emergence from the virtual reality environment.

In some implementations, detecting the occurrence of an event may include determining, based on sensor data generated and broadcast by a contact sensor, that a door or window has opened at a property. In such implementations, generating an alert notification that is configured to initiate the user's emergence from the virtual reality environment may include in response to determining, based on sensor data generated and broadcast by a contact sensor, that a door or window has opened at the property, generating an alert notification to initiate the user's emergence from the virtual reality environment.

In some implementations, detecting the occurrence of an event may include determining, based on data generated and broadcast by a connected doorbell, that a person is at the door or window. In such implementations, generating an alert notification that is configured to initiate the user's emergence from the virtual reality environment may include in response to determining, based on the data generated and broadcast by the connected doorbell, generating an alert notification to initiate the user's emergence from the virtual reality environment.

In some implementations, the monitoring unit is located in a remote location from property.

In some implementations, determining that the transmitted alert notification was unsuccessful in causing the user to emerge from the virtual reality environment and in response to determining that the transmitted alert notification was unsuccessful in causing the user to emerge from the virtual reality environment, generating a subsequent notification that is configured to instruct a drone to (i) navigate to a location that is associated with the user and (ii) make contact with the user.

According to another innovative aspect, a method disclosed for alerting a user immersed in a VR environment to the occurrence of an event at a property. In one aspect, the method may include actions of detecting the occurrence of an event at the property, determining, based on the obtained sensor data, that a user who is located at the property is immersed in a virtual reality environment, based on determining that the user who is located at the property is immersed in the virtual reality environment, generating a subsequent notification that is configured to instruct a drone to (i) navigate to a location that is associated with the user and (ii) make contact with the user in order to initiate the user's emergence from the virtual reality environment, and transmitting the generated alert notification to the drone.

The monitoring system described by the present disclosure provides multiple advantages over existing systems. For example, the monitoring system of the present disclosure can obtain and analyze sensor data generated by one or more sensors at the property to determine whether an occupant of the property is immersed in a virtual reality environment. Such a system does not require notifications from a virtual reality device indicating that a user is immersed in a virtual reality environment. Instead, the monitoring system can infer that a user is immersed in a virtual reality environment based on the sensor data. This can help to conserve network bandwidth because polling messages are not being transmitted by the virtual reality device to a monitoring unit of the monitoring system to inform the monitoring unit of the status of the virtual reality device. In addition, the monitoring system can detect, based on the sensor data whether an occupant is immersed in a virtual reality environment without the occupant having to inform the monitoring unit that the occupant is going to immerse himself or herself in a virtual reality environment.

The monitoring system of the present disclosure provides other advantages that are apparent from the detailed description below and from the drawings.

DETAILED DESCRIPTION

Figure 1:
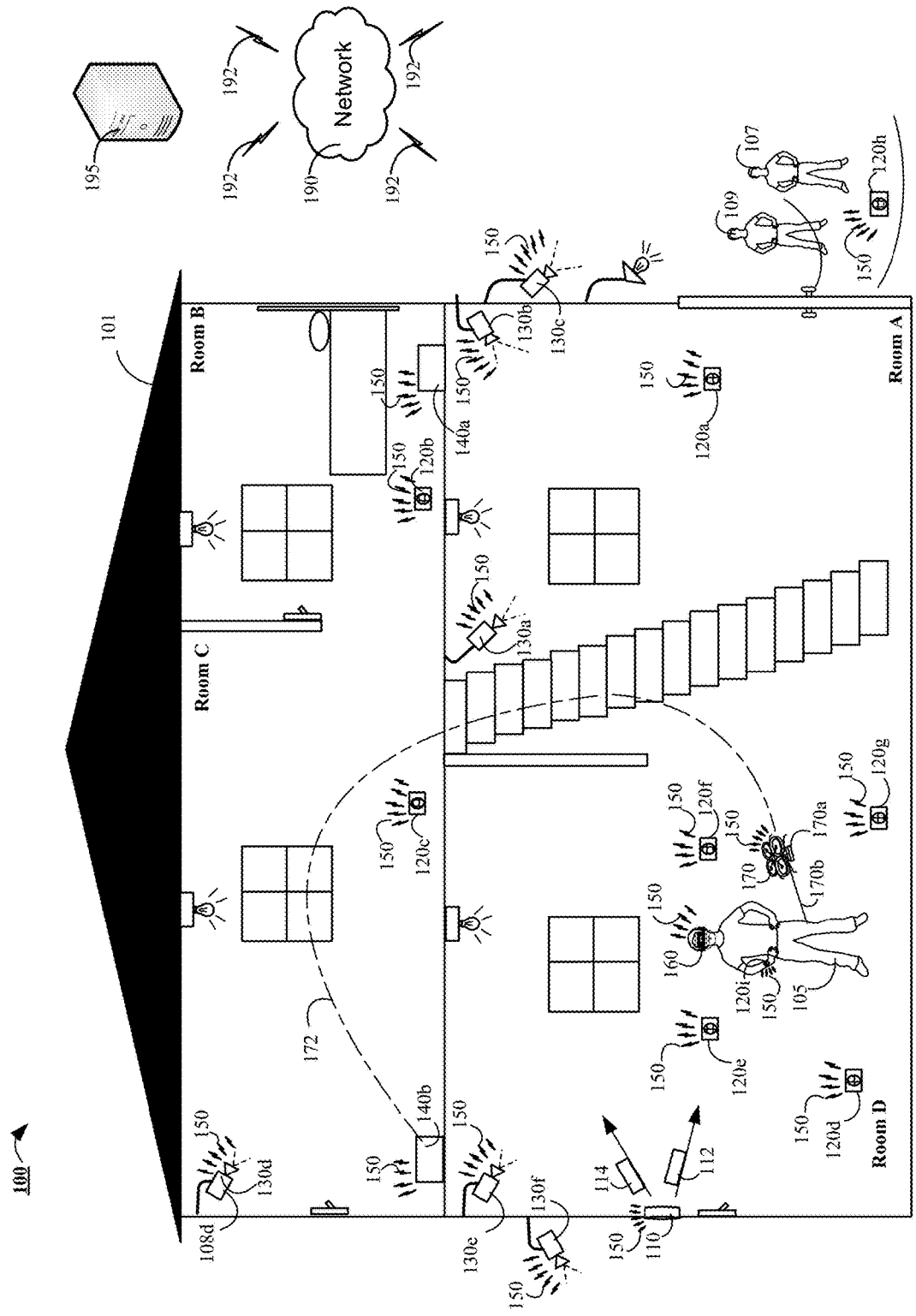
FIG. 1 is a contextual diagram of a system for alerting a user immersed in a virtual reality environment of the occurrence of an event that was detected at a property.

FIG. 1 is a contextual diagram of a system for alerting a user immersed in a virtual reality environment of the occurrence of an event that was detected at a property. The system 100 may include one or more monitoring system components such as a monitoring system control unit 110, one or more sensors 120a, 120b, 120c, 120d, 120e, 120f, 120g, 120h, 120i, one or more cameras 130a, 130b, 130c, 130d, 130e, 130f, one or more wireless charging stations 140a, 140b, a local wireless network 150, a virtual reality headset 160, a drone 170, a remote network 190, one or more communication links 192, a monitoring application server 195, or any combination thereof.

A monitoring system 100 may be employed in accordance with aspects of the present disclosure that does not include all of the aforementioned monitoring system components. In some implementations, for example, only a subset of the aforementioned components may be used to alert a user of virtual reality equipment in an attempt to initiate the user's emergence from a virtual reality experience in response to a detected event. As an example, there may be implementations that use less cameras than depicted by FIG. 1, more cameras than depicted by FIG. 1, or even no cameras. Similarly, for example, there may be implementations of the monitoring system 100 that use a drone, multiple drones, flying drones, land-based drones, or even no drones. Similarly, for example, there may be implementations that use less wireless charging stations, more wireless charging stations, no wireless charging stations, or the like. Yet other alternative implementations monitoring system 100 also fall within the scope of the present disclosure such as a system that does not use a monitoring application server 195. For these reasons, the system 100 should not be viewed as limiting the present disclosure to any particular set of necessary components.

The monitoring system control unit 110 obtains sensor data that is generated by one or more sensors 120a, 120b, 120c, 120d, 120e, 120f, 120g, 120h, 120i. The monitoring system control unit 110 may analyze the obtained sensor data in order to determine whether one or more potential events are occurring in the property 101, within a predetermined proximity of one or more portions of the property 101, or both. Alternatively, in other implementations, the monitoring system control unit 110 may relay the obtained sensor data to the monitoring data to application server 195 using the networks 150, 190, and one or more communication links 192. In such implementations, the monitoring application server may analyze the obtained sensor data in order to infer whether one or more potential events are occurring in the property 101. The monitoring application server 195 may then transmit a communication to the monitoring system control unit 110 indicating whether an event is detected in the property 101. In general, the monitoring application server 195 may also operate as a remote monitoring unit that can perform any of the operations described herein with respect to the monitoring system control unit 110.

Events that may be detected based on the obtained sensor data may include, for example, alarm events, emergency events, family events, calendar events, or the like. Alarm events may be inferred based on one or more sensors such as sensors 120a, 120b, 120c, 120d, 120e, 120f, 120g, 120h, 120i generating data that is indicative of a potential intruder breaking-and-entering into property 101, a trespasser trespassing within a predetermined proximity of property 101, or the like. Emergency events may be inferred based on one or more sensors such as sensors 120a, 120b, 120c, 120d, 120e, 120f, 120g, 120h, 120i generating data that is indicative of a potentially hazardous event such as the presence of smoke, fire, carbon monoxide (or other gas), or the like. Family events may be inferred based on one or more sensors such as sensors 120a, 120b, 120c, 120d, 120e, 120f, 120g, 120h, 120i indicating that a family member such as a husband, wife, sibling, kid or other legitimate occupant of the property 101 has entered the property 101. Calendar events may be inferred by the monitoring system control unit 110 accessing a user's 105 calendar maintained on one or more user devices, and determining that the user 105 has an upcoming appointment. The detections of yet other types of events may also fall within the scope of the present disclosure.

A user 105 may use a virtual reality headset 160 to immerse himself/herself into a virtual reality environment. The virtual reality headset 160 may include a display, one or more processing units, one or more memory units, one or more speakers, one or more microphones, or a combination thereof. In some implementations, the virtual reality headset 160 may be headwear that is configured to receive a user device such as a smartphone, and the user device can be used to create the virtual reality environment.

The virtual reality headset 160 may create an immersive virtual reality environment by generating a multi-dimensional image (e.g., a three dimensional image) that appears to surround the user 105. The virtual reality environment created by headset 160 may engage all, or a subset, of the user's 105 senses so that the user is tricked into forgetting that he/she is located at property 101 and instead makes the user actually feel like the user is in perceive that the user 105 is immersed in the virtual reality environment. This can include one or more of (i) creating visual effects to change what the user 105 sees, (ii) creating audio effects to change what the user 105 hears, (iii) creating smells to change what the user 105 smells, (iv) a combination thereof, or the like. Accordingly, while the user 105 is immersed in a virtual reality environment, the user 105 may not be aware of any potential events that may be happening in the user's immediate physical surroundings of property 101 because the user's 105 senses are distracted by the immersive virtual reality environment that the user 105 is experiencing.

The types of events that may be detected can vary in severity based on the types of potential events that are detected. For instance, some potential events may be low-risk events that are not fatal. For instance, a low-risk event may include a family event (e.g., kids arriving home from school, wife arriving home from work, or the like). Alternatively, some potential events may be high-risk events that may have the potential to be fatal. For example, a high-risk event may include an emergency event (e.g., a carbon monoxide leak, a fire, or the like), an alarm event (e.g., a breaking and entering, trespassing in the perimeter of the property, or the like). It is also contemplated that some potential events may be moderate-risk events that are not fatal but extremely important such as some calendar events (e.g., a meeting with a client, a meeting with a supervisor, or the like).

Upon the detection of such events, the monitoring system control unit 110 may determine whether a user 150 is immersed in a virtual reality environment. Determining whether a user 150 is immersed in a virtual reality environment may include, for example, obtaining sensor data generated by one or more sensors located throughout the property 101 such as sensors 120d, 120e, 120f, 120g and analyzing the obtained sensor data. For example, the sensor data may include data that is indicative of a user 105 using of a virtual reality headset 160. For instance, the obtained sensor data may indicate that a user 105 is present in the property 101, remaining substantially stationary in a particular portion of property 101, but moving the user's 105 head and arms. Alternatively, or in addition, the obtained sensor data may include data from one or more sensors 120i worn by the user 105. For example, the user 105 may wear a smartwatch, or other wearable device, having one or more sensors that measure, generate, broadcast, or a combination thereof, (i) sensor data associated with the user's health such as a user's heart rate, blood pressure, breathing rate, or the like, (ii) sensor data associated with the user's body parts such as whether a user's arm, leg, or other body part is moving, or (iii) the like. Alternatively, or in addition, the monitoring system control until 110 may receive notifications from the virtual reality headset 160 via the network 150 when the virtual reality headset is being used by the user 105.

In some implementations, a combination of sensor data from multiple different sensors 120a, 120b, 120c, 120d, 120e, 120f, 120g, 120h, 120i may be analyzed to detect whether a user 105 is currently immersed in a virtual reality environment. For instance, the monitoring system control unit 110 (or monitoring application server 195) may analyze (i) sensor data from sensors 120d, 120e, 120f, 120g in Room D that is indicative of the user's 105 presence in Room D, degree of movement, or both, (ii) sensor data from one or more wearable sensors 120i worn by the user 105 that may provide, e.g., biometric data (e.g., heart rate) related to the user 105, and (iii) sensor data from a sensor 120a such as a smoke detector in room A and determine whether a user is immersed in a virtual reality environment. For example, if the sensor data from Room D indicates that the user is in Room D, the sensor data from wearable sensor 120i indicates that the user's heart rate is indicative of a person who is alive and awake, and one or more smoke sensors or the like indicate the presence of smoke in property 101, the monitoring system control unit 110 (or monitoring application server 195) may conclude that the user 105 is immersed in a virtual reality environment because the sensor data indicates that there is a fire and the user 105 is in an adjacent room alive, awake, and not reacting to the fire. This may be because, for example, the user 105 cannot see the fire, hear the fire, feel the heat from the fire, or smell the smoke from the fire when immersed in the virtual reality environment created by the virtual reality headset 160. Other types of sensor data may be analyzed in a variety of different ways by the monitoring system control unit 110 (or monitoring application server 195) in order for the monitoring system control unit 110 (or monitoring application server 195) to determine that the user 105 is immersed in a virtual reality environment.

Once the monitoring system control unit 110 (or monitoring application server 195) identifies a potential event and determines that the user 105 is immersed in an immersive virtual reality environment created by virtual reality headset 160, the monitoring system control unit 110 may initiate actions to notify equipment creating a virtual reality environment in an attempt to trigger user 105 emergence from the virtual reality environment. In particular, the monitoring system control unit 110 may generate one or more alert notifications 112, 114. The alert notifications 112, 114 may be transmitted to virtual reality equipment creating a virtual reality environment such as the virtual reality headset 160, a server running virtual reality video that is being streamed to the virtual reality headset 160, or the like. The alert notifications 112, 114 may be configured to instruct (i) the virtual reality equipment to get the user 105 to emerge from the immersive virtual reality environment created by the virtual reality headset 160, (ii) a virtual reality server streaming video to the virtual reality headset, or (ii) the like to address the potential event detected by the monitoring system control unit 110 (or monitoring application server 195). Addressing the potential event may include, for example, emerging from the virtual reality environment to (i) meet the user's 105 kids after the kids come home from school, (ii) place a phone call to the user's 105 supervisor, (iii) use a fire extinguisher to put out a fire, (iv) confront a burglar, (v) flee the property 101, or the like.

Though the system 100 is described above with the monitoring system control unit 110 initiating actions to notify equipment creating a virtual reality environment only after the monitoring system control unit 110 determines that the user 105 is immersed in a virtual reality environment, the present disclosure need not be so limited. In some implementations, the monitoring system control unit 110 can initiate actions to notify equipment creating a virtual reality environment as soon as a potential event is detected. By way of example, upon the detection of more than a threshold amount of carbon monoxide in the air, the monitoring system control unit 110 may immediately transmit a notification to equipment creating a virtual reality environment to instruct the equipment to trigger a user's 105 emergence from the virtual reality environment without first determining whether the user 105 is immersed in a virtual reality environment.

The monitoring system control unit 110 may generate different types of messages that notify the user of the potential event and attempt to get the user 105 to emerge from the immersive virtual reality environment in different ways. For instance, the monitoring system control unit 110 may generate an alert notification 112 that is transmitted to the virtual reality headset 160. The alert notification 112 may include one or more instructions that instruct the virtual reality headset 160 to alert the user 105. For instance, the alert notification 112 may instruct the virtual reality headset 160 to provide a message for display on the graphical user interface of the virtual reality headset indicating the presence of an event, data describing the event, or both. Alternatively, or in addition, the alert notification 112 may instruct the virtual reality headset 160 to play an audio message notifying the user 105 of the potential event. Alternatively, or in addition, the alert notification 112 may be transmitted to a computer system (e.g., a server) that is networked to the virtual reality headset that instructs the computer system to pass-through a visual message, audio message, or the like to the virtual reality headset in an effort to notify the user of the potential event. Alternatively, or in addition, the alert notification 112 may instruct the virtual reality headset 160 to vibrate in an effort to inform the user 105 of the occurrence of a potential event. Alternatively, or in addition, the alert notification 112 may instruct the virtual reality headset 160 to power down. An alert notification 112 that includes an instruction for the virtual reality headset 160 to power down may be transmitted to the virtually reality headset 160 in certain instances where previous alert notifications have failed to get the user 105 to emerge from the immersive virtual reality environment.

Other types of alert notifications may include, for example, an alert notification 114. The alert notification 114 may be transmitted to a drone 170. The alert notification 114 may include an instruction that instructs the drone 170 to navigate to the user's 105 location and perform an action at the user's 105 location. The drone 170 may navigate along a flight path 172 to the user's 105 location. The user's 105 location may be determined based on one or more sensors such as sensors 120*d*, 120*e*, 120*f*, 120*g*, 120*i*.

Once the drone 170 arrives that the user's 105 location, the drone 170 may make contact with the user 105 in an effort to initiate the user's 105 emergence from a virtual reality environment. Making contact with the user 105 may include, for example, the drone 170 using an arm deployment mechanism 170*a* to deploy robotic arm 170*b* that can be used to make physical contact with the user 105. For example, the drone 170 may use the deployed robotic arm 170*b* to nudge the user 105 in the leg. The nudge of the user's 105 leg may be performed with a sufficient force in order to startle the user 105, and urge the user 105 to emerge from the immersive virtual reality environment to investigate the cause of the nudge. Once the user emerges from the immersive virtual reality environment, the user's 105 senses may adjust, and potentially become aware of the existence of the potential event (e.g., become aware that his/her kids are home, become aware of the presence of smoke, or the like).

The subject matter disclosed by the present specification does not require that a drone 170 making contact with the user 105 must include the drone 170 making physical contact. Instead, the drone 170 may make other types of contact with the user 105. For example, the drone 170 may make non-physical contact with the user by using a speaker to output audible tones. The outputted audible tones may include the output of audible tones that are loud enough for the user 105 to hear the audible tones over the sounds of the immersive virtual reality environment that is created by the virtual reality device 160. Alternatively, or in addition, the drone 170 may make non-physical contact with a user 105 by transmitting a message to the virtual reality device 160 that can be received by the virtual reality device 160 and processed to generate, by the virtual reality device 160, an output that can initiate the user's 105 emergence from the virtual reality environment. Alternatively, or in addition, the drone 170 may make non-physical contact with the user 105 by providing a visual output that can be used to initiate the user's 105 emergence from a virtual reality environment. For example, the drone 170 may navigate to the user's location 105 (or to another location) and generate a visual output such as flashing lights that indicates the occurrence of a potential event. In some implementations, such visual output generated by the drone 170 may be intended to alert a person of the property who is not immersed in a virtual reality environment so that the person can communicate (e.g., shout at user 105, physical contact user 105, or the like) with the user 105 in a way that will get the user 105 to emerge from the virtual reality environment. In other implementations, the drone 170 can use such visual outputs to communicate the occurrence of an event to the user 105 after the user emerges from the virtual reality environment, removes the virtual reality device 160, or a combination thereof.

With reference to the example of FIG. 1, the user 105 is immersed in a virtual reality environment created by the virtual reality device 160. The monitoring system control unit 110 may detect sensor data generated by sensor 120*h* that indicates that the user's kids 107, 109 have arrived home and are going to walk through the front door into Room A. The detected sensor data may include, for example, sensor data generated and broadcast by a motion sensor indicating that an object has moved through the exterior door into Room A. The detected sensor data may include, for example, sensor data generated and broadcast by a contact sensor that indicates an exterior door to Room A has been opened. Alternatively, or in addition, the sensor data may include, for example, sensor data generated and broadcast by a connected doorbell that was rung by one or more persons standing in front of the exterior door into Room A. After detecting the presence of the kids 107, 109, the monitoring system control unit 110 may determine whether the user 105 is immersed in an immersive virtual reality environment. In response to detecting the family event of the kids 107, 109 coming home and determining that the user 105 is immersed in an immersive virtual reality environment, the monitoring system control unit 110 may transmit a notification 112 to the virtual reality headset 160 that instructs the virtual reality headset 160 to display a visual message indicating that the user's kids are home. Then, the user 160 can choose to emerge from the immersive virtual reality environment, walk to Room A, and greet his/her kids.

In some instances, an initial set of one or more notification alerts may not be successful in getting the user 105 to emerge from the immersive virtual reality environment. In such implementations, or other implementations that have not had prior failures, the monitoring system control unit 110 may transmit an instruction to a drone device 170 that instructs the drone 170 to begin to navigate along a flight path 172 to the location of the user 105. The drone device 170 may then travel to the user 105 along the flight path, and perform an action when the drone 170 arrives within a predetermined distance of the user 105. The action may include a nudge with a robotic arm, output of loud blaring audio using a speaker of the drone, output of one or more visual signals (e.g., flashing lights, video message output on a drone display, or the like), transmitting a message that, when processed by the virtual reality device 160 causes the virtual reality device 160 to output a notification such as an audio output or a video output that initiate the user's 105 emergence from the virtual reality environment. Though this example describes a flying drone, the present disclosure need not be so limited. For example, other non-flying robotic devices may be used such as a robot capable of navigating an area of the property 101 by walking, rolling, or the like. By way of example, in response to detecting a potential event, the monitoring system control unit 110 may instruct a rolling drone to roll along the floor and bump into the user's 105 leg in an effort to get the user to emerge from a virtual reality state.

In some implementations, the type of alert notification may be based on the severity of the event that is associated with alert. For instance, the monitoring system control unit 110 may merely provide the virtual reality headset 160 with an instruction to output an audio alert when a low-risk event is detected. Alternatively, or in addition, for example, the monitoring control unit 110 may initiate deployment of one or more drones that can be used to navigate to the user's 105 location, and nudge the user 105 in an escalated effort to get the user 105 to emerge from the immersive virtual reality environment in response to a moderate-risk event or a high-risk event. Alternatively, or in addition, for example, the monitoring system control unit 110 may instruct the virtual reality headset 160 to power down in response to the detection of a high-risk event.

The severity of the alert may be determined in a variety of different ways. For example, the system may determine a severity of the event based on a calculated severity score. The severity score may be based on a variety of factors including the obtained sensor data (e.g., (i) sensor data indicating biometric data of the user such as a user's heart rate, breathing rate, or the like, (ii) sensor data describing sensed attributes of the property such as number of moving objects, or (iii) the like), the type of detected event (e.g., an alarm events, an emergency events, family events, calendar events, or the like), the state of the monitoring system (e.g., armed, not armed, number of events detected, number of alarm events detected, number of emergency events detected, or the like), whether one or more previous alerts were sent to the VR device, the time of day, or the like. For example, a lower severity score may be associated with a family event and a higher severity score may be associated with an emergency event. In such instances, the monitoring system control unit may generate instructions for a less intrusive alert such as instructions that cause vibration of the VR headset for a calendar event (e.g., kids arriving home from school). On the other hand, the monitoring system control unit may generate instructions for a more intrusive alert such generation of a visual output on the display of the VR headset for an alarm event that is based on the sensor data sensing motion in a portion of the property). By way of yet another example, the monitoring system control unit may generate instructions for an even more intrusive alert such as powering down of the VR device in response to an emergency event such as a fire. Alternatively, however, the monitoring system control unit may only generate instructions for the rather intrusive alert of powering down the VR device when a severe event is detected and the user has not responded to one or more prior alerts transmitted to the VR device.

The monitoring system control unit 110 can evaluate the severity score against one or more predetermined thresholds to determine a type of alert that should be selected. If the severity score does not satisfy a first severity threshold, then a non-intrusive alert such as a vibration of the virtual reality headset 160 may be selected. Alternatively, if the severity score satisfies a first severity threshold, then a more intrusive alert may be selected such as an audio message. Additional severity thresholds may also be set for different types of alerts such as video alerts, and power shut down alerts. For example, if the severity score is satisfies both the first severity threshold and a second severity threshold, then a video alert may be selected. Finally, if the severity score satisfies a first severity threshold, a second severity threshold, and a third severity threshold, then monitoring system control unit may select a power shutdown alert. Different thresholds having a different hierarchical order may also be selected, as this hierarchy of thresholds is just one example of an alert severity threshold hierarchy.

In some implementations, the monitoring system control unit 110 may also evaluate the detected event to determine whether a user should even be alerted to the occurrence of the event. For example, the monitoring system control unit 110 be configured to determine the importance of a detected event. If the event is determined to have more than a predetermined level of importance, then the monitoring system control unit 110 may generate an alert that includes one or more instructions, that when processed by the virtual reality headset 160, alert the user 105 to the occurrence of the event. Alternatively, if the event is determined to have less than a predetermined level of significance, then the monitoring system control unit 110 will not generate an alert that can be used to alert the user 105 as to the occurrence of the event. This provides the advantage of reducing the amount of interruptions to the user's 105 virtual reality experience and only alerting the user 105 to the occurrence of events that are sufficiently important.

The monitoring system control unit 110 may determine a level of importance associated with the occurrence of a detected event based at least in part on a calculated importance score. The importance score may be based on the obtained sensor data (e.g., number of moving objects), the type of detected event (e.g., an alarm events, an emergency events, family events, calendar events, or the like), the duration of the detected event (e.g., quick movement of an animal darting across the property or consistent movement around a window or door of a property), the state of the monitoring system (e.g., armed, not armed, number of events detected, number of alarm events detected, number of emergency events detected, or the like), the time of day, or the like.

The monitoring system control unit 110 can evaluate the importance score against a predetermined threshold. If the importance score is determined to satisfy the predetermined threshold, then the monitoring system control unit 110 can determine to generate an alert message that can be transmitted to the virtual reality device 160 and processed by the virtual reality device 160 to output an alert. Alternatively, if the importance score is determined to not satisfy the predetermined threshold, then the monitoring system control unit 110 can determine to not generate an alert message to the virtual reality device 160 and avoid interrupting the user's 105 virtual reality experience.

The importance score, the severity score, or both, can therefore be used to intelligently alert a user 105 immersed in a virtual reality environment of the detection of the occurrence of an event.

The example of FIG. 1 describes a system where a monitoring system control unit 110 notifies equipment creating a virtual reality environment of the presence of an event. However, the present disclosure need not be so limited. For instance, the monitoring system may also be configured to notify equipment that creates augment reality environments, holography environments, or the like. For example, use of a monitoring system control unit 110 to notify equipment creating an augmented reality environment of the presence of an event also falls within the scope of the present disclosure. For example, use of a monitoring system control unit 110 to notify equipment creating an augmented reality environment of the presence of an event, and instructing the augmented reality system to get the user 105 to emerge from the augmented reality environment also falls within the scope of the present disclosure.

Figure 2:
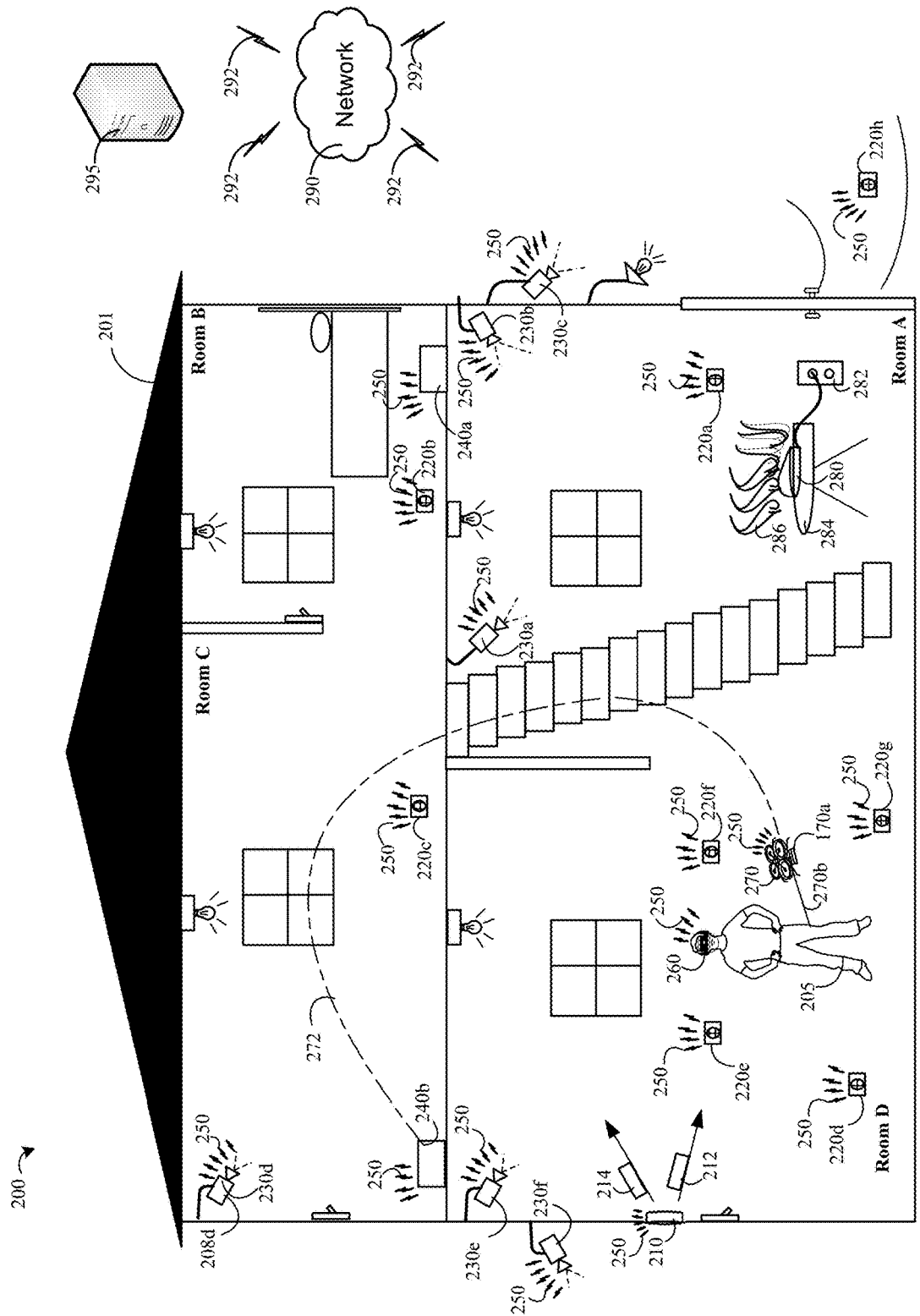
FIG. 2 is another contextual diagram of a system for alerting a user immersed in a virtual reality environment of the occurrence of an event that was detected at a property.

FIG. 2 is another contextual diagram of a system 200 for alerting a user 205 immersed in a virtual reality environment of the occurrence of an event that was detected at a property. The system 200 is substantially the same as the system 100 except that the system 200 is an example of the system notifying a user 205 to get the user 205 to emerge from an immersive virtual reality environment generated by virtual reality headset 260 in response to the detection of an emergency event such as a fire.

With reference to the example of FIG. 2, assume that the user 205 was using an iron 280 prior to immersing himself/herself in a virtual reality environment. In the user's 205 rush to enter the virtual reality environment, the user 205 forgot to turn off the iron 280, left the iron plugged in 282, and placed the iron 280 face down on the ironing board 284. Then, the user 205 uses the virtual reality headset 260 to immerse himself/herself into an immersive virtual reality environment.

The monitoring system control unit 210 may detect sensor data generated by sensor 220a that indicates that there is a fire 286 in Room A. For example, the sensor 220a may detect increased temperatures, smoke, or a combination thereof. The monitoring system control unit 210 may determine that the user 205 is immersed in a virtual reality environment because obtained sensor data indicates that the user 205 is in an adjacent Room D, is associated with biometric data indicating that the user 205 is alive and awake, and that the user 205 is showing no reaction to the fire 286. In response to the detection of the fire 286, the monitoring system control unit 210 may transmit a notification 212 to the virtual reality headset 260 that instructs the virtual reality headset 260 to power down immediately based on the high risk threat of a fire 286. Then, the user 260 can immediately emerge from the immersive virtual reality environment, and take necessary steps to use a fire extinguisher to put out the fire 286, exit the property, or the like.

Alternatively, the monitoring system control unit 210 may transmit an instruction to a drone device 270 that instructs the drone 270 to navigate a flight path 272 to the location of the user 205. The drone device 270 may then travel to the user 205 using the flight path, and perform an action. The action may include a nudge with a robotic arm, output of loud blaring audio using a speaker of the drone, or the like. In some implementations, a drone 270 may be used by the system 200 because, for example, the monitoring system control unit 210 is unable to communicate with the virtual reality headset 260, is unsuccessful in getting the user 205 to emerge from the immersive virtual reality environment, or the like. In severe scenarios, the monitoring system control unit 210 may be configured to deploy multiple drones that can each be used to make physical contact with the user 205 in an effort to get the user 205 to emerge from the immersive virtual reality environment.

Though this example describes a flying drone, the present disclosure need not be so limited. For example, other non-flying robotic devices may be used such as a robot capable of navigating an area of the property 201 by walking, rolling, or the like. By way of example, in response to detecting a potential event, the monitoring system control unit 210 may instruct a rolling drone to roll along the floor and bump into the user's 205 leg in an effort to wake the user from a virtual reality state.

Though the system 200 is described above with the monitoring system control unit 210 initiating actions to notify equipment creating a virtual reality environment only after the monitoring system control unit 210 determines that the user 205 is immersed in a virtual reality environment, the present disclosure need not be so limited. In some implementations, the monitoring system control unit 210 can initiate actions to notify equipment creating a virtual reality environment (or the drone 270) as soon as a potential event is detected. By way of example, upon the detection of more than a threshold amount of carbon monoxide in the air, the monitoring system control unit 110 may immediately transmit a notification to equipment creating a virtual reality environment to instruct the equipment to initiate a user's 205 emergence from the virtual reality environment without first determining whether the user 205 is immerged in a virtual reality environment. Similarly, upon the detection of a fire, the monitoring system control unit 210 may immediately transmit a notification to the drone 270 to nudge the user 205 to initiate the user's 205 emergence from the virtual reality environment without first determining whether the user 205 is immerged in a virtual reality environment.

The example of FIG. 2 describes a system where a monitoring system control unit 210 notifies equipment creating a virtual reality environment of the presence of an event. However, the present disclosure need not be so limited. For instance, the monitoring system may also be configured to notify equipment that creates augment reality environments, holography environments, or the like. For example, use of a monitoring system control unit 210 to notify equipment creating an augmented reality environment of the presence of an event, and instructing the augmented reality system to get the user 205 to emerge from the augmented reality environment also falls within the scope of the present disclosure.

Figure 3:
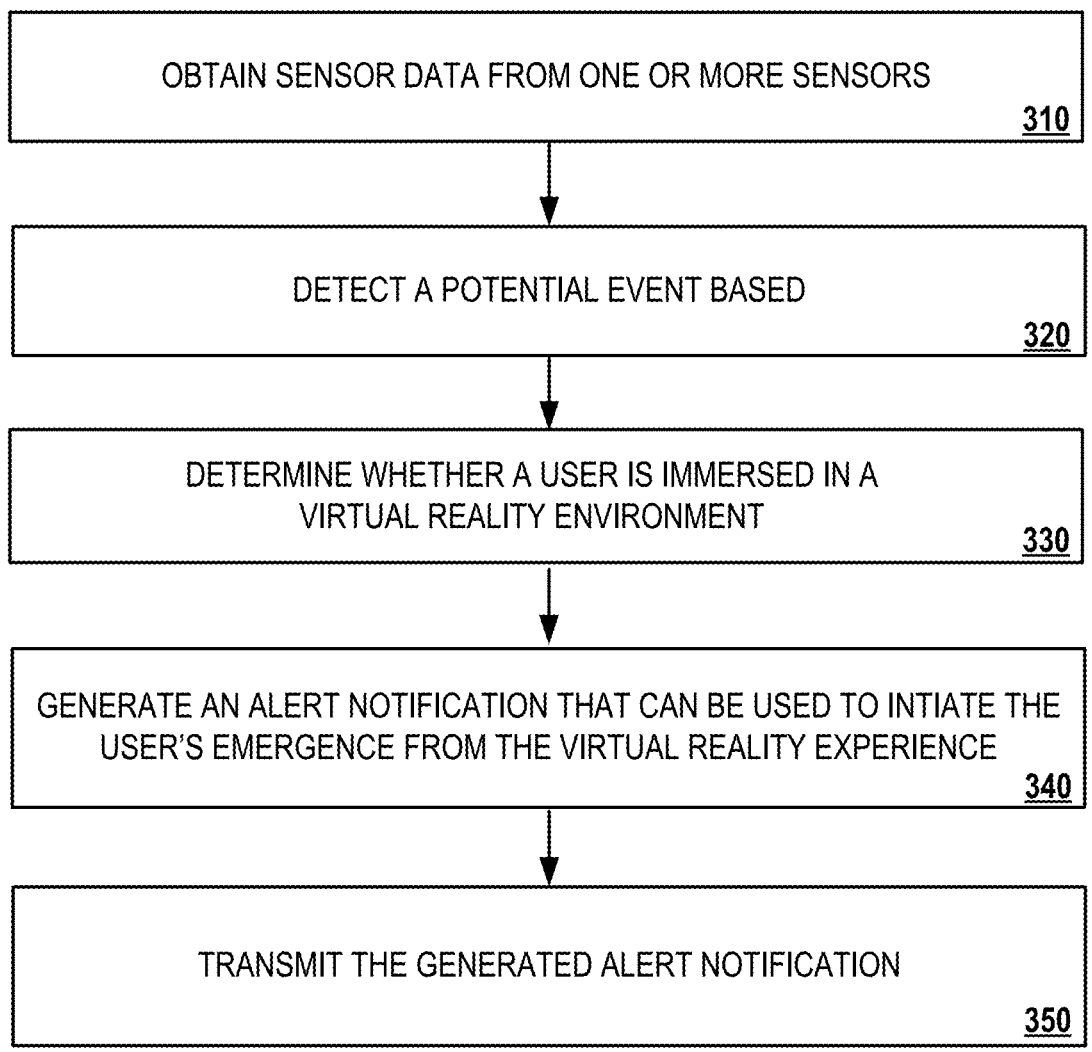
FIG. 3 is a flowchart of a process for alerting a user immersed in a virtual reality environment of the occurrence of an event that was detected at a property.

FIG. 3 is a flowchart of a process for alerting a user immersed in a virtual reality environment of the occurrence of an event that was detected at a property. Generally, the process 300 includes obtaining sensor data from one or more sensors 310, detecting a potential event 320, determining whether a user is immersed in a virtual reality environment based on the sensor data 330, generating an alert notification that can be used to initiate the user's emergence from the virtual reality experience 340, and transmitting the generated alert notification 350.

In more detail, a computer such as a monitoring system control unit may obtain sensor data from one or more sensors at stage 310. Obtaining sensor data from one or more sensors may include, for example, obtaining data generated by one or more motion sensors, one or more smoke sensors, one or more temperature sensors, one or more biometric sensors, one or more wearable sensors, a combination thereof, or the like.

The monitoring system control unit may detect a potential event at stage 320. In some implementations, the monitoring system control unit may detect the occurrence of the potential event based on obtained sensors data. For example, the monitoring system control unit may analyze the obtained sensor data to infer the likelihood that the data is indicative of an event. Such events may include, for example, alarm events, emergency events, family events, or the like. In other implementations, the monitoring system control unit may detect the occurrence of the potential event without analyzing obtained sensor data. For example, the monitoring system control unit may detect the occurrence of a potential event by accessing one or more calendar event records associated with a user's calendar. Such events may include calendar events such a work meeting, a personal meeting, or the like that have been added to a user's calendar.

The monitoring system control unit may determine whether a user is immersed in a virtual reality environment based on the obtained sensor data at stage 330. Determining whether a user is immersed in a virtual reality environment may include, for example, obtaining sensor data generated by one or more sensors located throughout the property and analyzing the obtained sensor data. For example, the sensor data may include data that is indicative of user using a virtual reality headset. For instance, a user may be present in the property, remaining stationary in a particular portion of property, but moving the user's head and arms. Alternatively, or in addition, the sensor data my may include data from one or more sensors worn by the user. For example, the user may wear a smartwatch, or other wearable device, that provides sensor data regarding the user's health such as a user's heartbeat.

Alternatively, or in addition, the monitoring system control unit may also determine whether a user is immersed in a virtual reality environment without analyzing the obtained sensor data. For example, the monitoring system control until may receive status notifications from the virtual reality headset via the network that indicate when the virtual reality headset is being used by the user.

In some implementations, a combination of sensor data from multiple different sensors may be analyzed to detect that a user is currently immersed in a virtual reality environment at stage 330. For instance, the monitoring system control unit may analyze (i) sensor data from sensors that is indicative of the user's presence in a particular location of a property, degree of movement, both, or the like, (ii) sensor data from one or more wearable sensors worn by the user that may provide, e.g., biometric data (e.g., heartbeat) related to the user, and (iii) sensor data from a sensor such as a smoke detector and determine whether a user is immersed in a virtual reality environment.

The monitoring system control unit may determine whether the event is important enough to generate an alert notification that can be used to initiate the user's emergence from the virtual reality experience at stage 340. Determining that the event is important enough to generate an alert notification may be based on the calculation and evaluation of an importance score for the event. In response to determining that the event is important enough to generate an alert notification, the monitoring system control unit can generate an alert notification that can be used to initiate the user's emergence from the virtual reality experience. Determining whether the event is important enough may be based on the comparison of the importance score to a predetermined threshold.

The alert notifications may be configured to get the user to emerge from the immersive virtual reality environment created by the virtual reality headset to address the potential event detected by the monitoring system control unit. In some implementations, the monitoring system control unit may select a particular type of alert notification for generation based on the severity of the potential event. For example, the monitoring system control unit may select a particular type of event based on a severity score that is calculated for the potential event.

The monitoring system control unit may transmit the generated alert notification 350. In some implementations, the generated alert notifications may be transmitted to a virtual reality device such as a virtual reality headset. Alternatively, or in addition, the alert may be transmitted to another device such as a drone, a mobile device (e.g., a smartphone, tablet, etc), or the like.

In some implementations, the drone may receive the transmitted message and perform one or more operations such as navigating to and poking the user to get the user to emerge from the virtual reality environment. In the same, or other, implementations, the generated notification may be transmitted to a mobile device of a different occupant of the property or a mobile device of a registered contact designated by the user of the virtual reality device. The different occupant or the registered contact may then take one or more actions to get the user of the virtual reality device to emerge from the virtual reality environment. In the cases of the drone or mobile device, the generated alert message may be include one or more instructions that are configured to cause each respective device to perform their respective actions in response to the alert (e.g., drone deploying, navigating to, and poking the user or a mobile device generating an audible or visual notification/alert).

Figure 4:
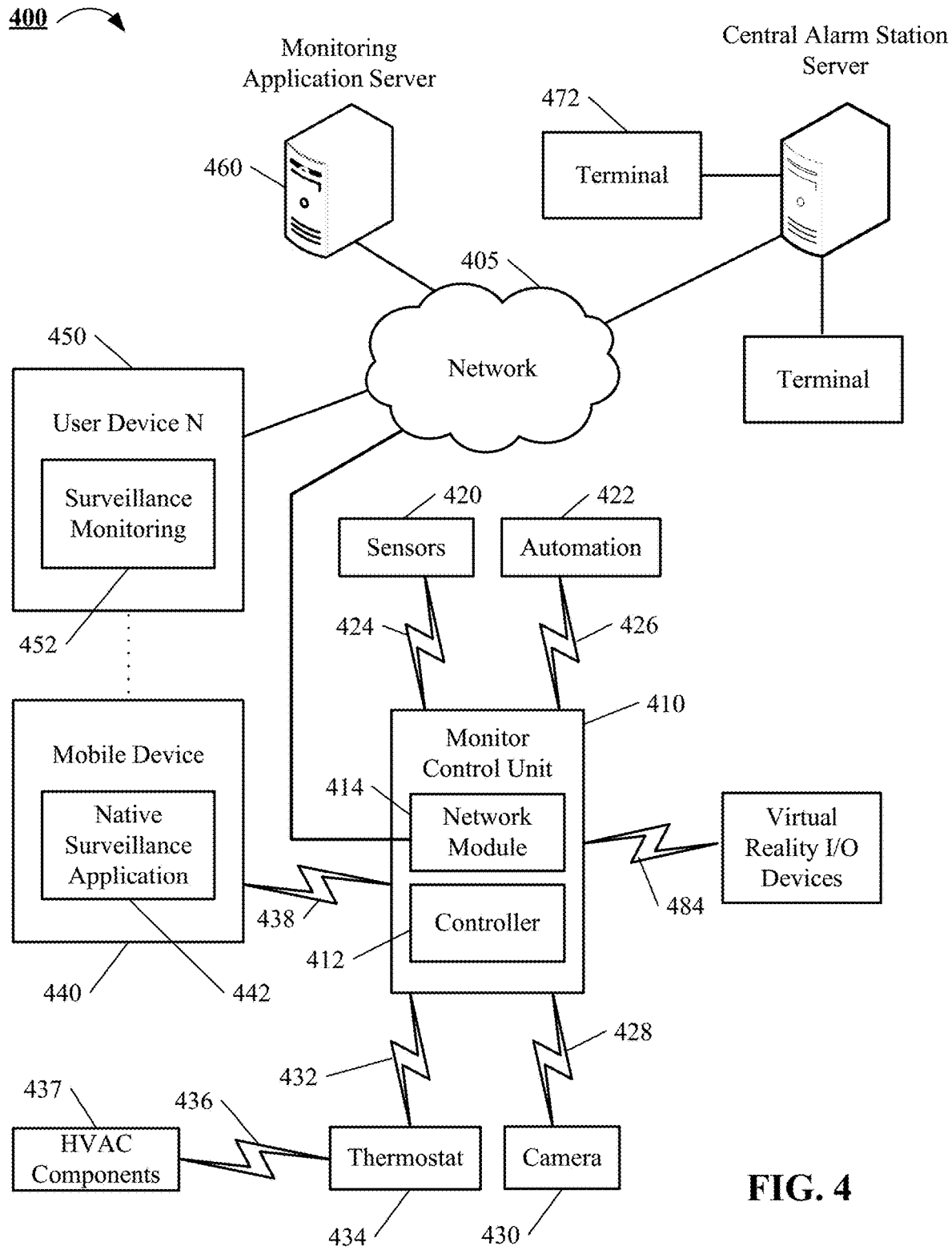
FIG. 4 is a block diagram of an example of a security monitoring system 400 that may utilize virtual reality components.

FIG. 4 is a block diagram of an example of a security monitoring system 400 that may utilize virtual reality components.

A security system is augmented with virtual reality components. A virtual reality headset allows a user to explore sensed attributes of a property in virtual environment such that the user may be guided through an installation process and investigate an entirety of a home from an upstairs bedroom.

FIG. 4 illustrates an example of an electronic system 400 configured to provide surveillance and reporting. The electronic system 400 includes a network 405, a monitoring system control unit 410, one or more user devices 440, 450, a monitoring application server 460, and a central alarm station server 470. In some examples, the network 405 facilitates communications between the monitoring system control unit 410, the one or more user devices 440, 450, the monitoring application server 460, and the central alarm station server 470.

The network 405 is configured to enable exchange of electronic communications between devices connected to the network 405. For example, the network 405 may be configured to enable exchange of electronic communications between the monitoring system control unit 410, the one or more user devices 440, 450, the monitoring application server 460, and the central alarm station server 470. The network 405 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 405 may include multiple networks or subnetworks, each of which may include, for example, a wired or wireless data pathway. The network 405 may include a circuit-switched network, a packet-switched data network, or any other network able to carry electronic communications (e.g., data or voice communications). For example, the network 405 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 405 may include one or more networks that include wireless data channels and wireless voice channels. The network 405 may be a wireless network, a broadband network, or a combination of networks including a wireless network and a broadband network.

The monitoring system control unit 410 includes a controller 412 and a network module 414. The controller 412 is configured to control a monitoring system (e.g., a home alarm or security system) that includes the monitoring system control unit 410. In some examples, the controller 412 may include a processor or other control circuitry configured to execute instructions of a program that controls operation of an alarm system. In these examples, the controller 412 may be configured to receive input from sensors, detectors, or other devices included in the alarm system and control operations of devices included in the alarm system or other household devices (e.g., a thermostat, an appliance, lights, etc.). For example, the controller 412 may be configured to control operation of the network module 414 included in the monitoring system control unit 410.

The network module 414 is a communication device configured to exchange communications over the network 405. The network module 414 may be a wireless communication module configured to exchange wireless communications over the network 405. For example, the network module 414 may be a wireless communication device configured to exchange communications over a wireless data channel and a wireless voice channel. In this example, the network module 414 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 414 also may be a wired communication module configured to exchange communications over the network 405 using a wired connection. For instance, the network module 414 may be a modem, a network interface card, or another type of network interface device. The network module 414 may be an Ethernet network card configured to enable the monitoring system control unit 410 to communicate over a local area network and/or the Internet. The network module 414 also may be a voiceband modem configured to enable the alarm panel to communicate over the telephone lines of Plain Old Telephone Systems (POTS).

The monitoring system that includes the monitoring system control unit 410 includes one or more sensors or detectors. For example, the monitoring system may include multiple sensors 420. The sensors 420 may include a contact sensor, a motion sensor, a glass break sensor, or any other type of sensor included in an alarm system or security system. The sensors 420 also may include an environmental sensor, such as a temperature sensor, a water sensor, a rain sensor, a wind sensor, a light sensor, a smoke detector, a carbon monoxide detector, an air quality sensor, etc. The sensors 420 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 420 may include a radio-frequency identification (RFID) sensor that identifies a particular article that includes a pre-assigned RFID tag.

The monitoring system control unit 410 communicates with the module 422 and the camera 430 to perform surveillance or monitoring. The module 422 is connected to one or more devices that enable home automation control. For instance, the module 422 may be connected to one or more lighting systems and may be configured to control operation of the one or more lighting systems. Also, the module 422 may be connected to one or more electronic locks at the property and may be configured to control operation of the one or more electronic locks (e.g., control Z-Wave locks using wireless communications in the Z-Wave protocol. Further, the module 422 may be connected to one or more appliances at the property and may be configured to control operation of the one or more appliances. The module 422 may include multiple modules that are each specific to the type of device being controlled in an automated manner. The module 422 may control the one or more devices based on commands received from the monitoring system control unit 410. For instance, the module 422 may cause a lighting system to illuminate an area to provide a better image of the area when captured by a camera 430.

The camera 430 may be a video/photographic camera or other type of optical sensing device configured to capture images. For instance, the camera 430 may be configured to capture images of an area within a building monitored by the monitoring system control unit 410. The camera 430 may be configured to capture single, static images of the area and also video images of the area in which multiple images of the area are captured at a relatively high frequency (e.g., thirty images per second). The camera 430 may be controlled based on commands received from the monitoring system control unit 410.

The camera 430 may be triggered by several different types of techniques. For instance, a Passive Infra Red (PIR) motion sensor may be built into the camera 430 and used to trigger the camera 430 to capture one or more images when motion is detected. The camera 430 also may include a microwave motion sensor built into the camera and used to trigger the camera 430 to capture one or more images when motion is detected. The camera 430 may have a "normally open" or "normally closed" digital input that can trigger capture of one or more images when external sensors (e.g., the sensors 420, PIR, door/window, etc.) detect motion or other events. In some implementations, the camera 430 receives a command to capture an image when external devices detect motion or another potential alarm event. The camera 430 may receive the command from the controller 412 or directly from one of the sensors 420.

In some examples, the camera 430 triggers integrated or external illuminators (e.g., Infra Red, Z-wave controlled "white" lights, lights controlled by the module 422, etc.) to improve image quality when the scene is dark. An integrated or separate light sensor may be used to determine if illumination is desired and may result in increased image quality.

The camera 430 may be programmed with any combination of time/day schedules, system "arming state", or other variables to determine whether images should be captured or not when triggers occur. The camera 430 may enter a low-power mode when not capturing images. In this case, the camera 430 may wake periodically to check for inbound messages from the controller 412. The camera 430 may be powered by internal, replaceable batteries if located remotely from the monitoring control unit 410. The camera 430 may employ a small solar cell to recharge the battery when light is available. Alternatively, the camera 430 may be powered by the controller's 412 power supply if the camera 430 is co-located with the controller 412.

In some implementations, the camera 430 communicates directly with the monitoring application server 460 over the Internet. In these implementations, image data captured by the camera 430 does not pass through the monitoring system control unit 410 and the camera 430 receives commands related to operation from the monitoring application server 460.

The system 400 also includes thermostat 434 to perform dynamic environmental control at the property. The thermostat 434 is configured to monitor temperature and/or energy consumption of an HVAC system associated with the thermostat 434, and is further configured to provide control of environmental (e.g., temperature) settings. In some implementations, the thermostat 434 can additionally or alternatively receive data relating to activity at a property and/or environmental data at a property, e.g., at various locations indoors and outdoors at the property. The thermostat 434 can directly measure energy consumption of the HVAC system associated with the thermostat, or can estimate energy consumption of the HVAC system associated with the thermostat 434, for example, based on detected usage of one or more components of the HVAC system associated with the thermostat 434. The thermostat 434 can communicate temperature and/or energy monitoring information to or from the monitoring system control unit 410 and can control the environmental (e.g., temperature) settings based on commands received from the monitoring system control unit 410.

In some implementations, the thermostat 434 is a dynamically programmable thermostat and can be integrated with the monitoring system control unit 410. For example, the dynamically programmable thermostat 434 can include the monitoring system control unit 410, e.g., as an internal component to the dynamically programmable thermostat 434. In addition, the monitoring system control unit 410 can be a gateway device that communicates with the dynamically programmable thermostat 434.

A module 437 is connected to one or more components of an HVAC system associated with a property, and is configured to control operation of the one or more components of the HVAC system. In some implementations, the module 437 is also configured to monitor energy consumption of the HVAC system components, for example, by directly measuring the energy consumption of the HVAC system components or by estimating the energy usage of the one or more HVAC system components based on detecting usage of components of the HVAC system. The module 437 can communicate energy monitoring information and the state of the HVAC system components to the thermostat 434 and can control the one or more components of the HVAC system based on commands received from the thermostat 434.

In some examples, the system 400 further includes one or more robotic devices. The robotic devices may be any type of robots that are capable of moving and taking actions that assist in security monitoring. For example, the robotic devices may include drones that are capable of moving throughout a property based on automated control technology and/or user input control provided by a user. In this example, the drones may be able to fly, roll, walk, or otherwise move about the property. The drones may include helicopter type devices (e.g., quad copters), rolling helicopter type devices (e.g., roller copter devices that can fly and also roll along the ground, walls, or ceiling) and land vehicle type devices (e.g., automated cars that drive around a property). In some cases, the robotic devices may be robotic devices that are intended for other purposes and merely associated with the monitoring system 400 for use in appropriate circumstances. For instance, a robotic vacuum cleaner device may be associated with the monitoring system 400 as one of the robotic devices and may be controlled to take action responsive to monitoring system events.

In some examples, the robotic devices automatically navigate within a property. In these examples, the robotic devices include sensors and control processors that guide movement of the robotic devices within the property. For instance, the robotic devices may navigate within the property using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices may include control processors that process output from the various sensors and control the robotic devices to move along a path that reaches the desired destination and avoids obstacles. In this regard, the control processors detect walls or other obstacles in the property and guide movement of the robotic devices in a manner that avoids the walls and other obstacles.

In addition, the robotic devices may store data that describes attributes of the property. For instance, the robotic devices may store a floorplan and/or a three-dimensional model of the property that enables the robotic devices to navigate the property. During initial configuration, the robotic devices may receive the data describing attributes of the property, determine a frame of reference to the data (e.g., a home or reference location in the property), and navigate the property based on the frame of reference and the data describing attributes of the property. Further, initial configuration of the robotic devices also may include learning of one or more navigation patterns in which a user provides input to control the robotic devices to perform a specific navigation action (e.g., fly to an upstairs bedroom and spin around while capturing video and then return to a home charging base). In this regard, the robotic devices may learn and store the navigation patterns such that the robotic devices may automatically repeat the specific navigation actions upon a later request.

In some examples, the robotic devices may include data capture and recording devices. In these examples, the robotic devices may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the property and users in the property. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices to take and store a biometric sample that can be used to identify the person (e.g., a biometric sample with DNA that can be used for DNA testing).

In some implementations, the robotic devices may include output devices. In these implementations, the robotic devices may include one or more displays, one or more speakers, and/or any type of output devices that allow the robotic devices to communicate information to a nearby user.

The robotic devices also may include a communication module that enables the robotic devices to communicate with the monitoring system control unit 410, each other, and/or other devices. The communication module may be a wireless communication module that allows the robotic devices to communicate wirelessly. For instance, the communication module may be a Wi-Fi module that enables the robotic devices to communicate over a local wireless network at the property. The communication module further may be a 900 MHz wireless communication module that enables the robotic devices to communicate directly with the monitoring system control unit 410. Other types of short-range wireless communication protocols, such as Bluetooth, Bluetooth LE, Zwave, Zigbee, etc., may be used to allow the robotic devices to communicate with other devices in the property.

The robotic devices further may include processor and storage capabilities. The robotic devices may include any suitable processing devices that enable the robotic devices to operate applications and perform the actions described throughout this disclosure. In addition, the robotic devices may include solid state electronic storage that enables the robotic devices to store applications, configuration data, collected sensor data, and/or any other type of information available to the robotic devices.

The robotic devices are associated with one or more charging stations. The charging stations may be located at predefined home base or reference locations in the property. The robotic devices may be configured to navigate to the charging stations after completion of tasks needed to be performed for the monitoring system 400. For instance, after completion of a monitoring operation or upon instruction by the monitoring system control unit 410, the robotic devices may be configured to automatically fly to and land on one of the charging stations. In this regard, the robotic devices may automatically maintain a fully charged battery in a state in which the robotic devices are ready for use by the monitoring system 400.

The charging stations may be contact based charging stations and/or wireless charging stations. For contact based charging stations, the robotic devices may have readily accessible points of contact that the robotic devices are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices may charge through a wireless exchange of power. In these cases, the robotic devices need only locate themselves closely enough to the wireless charging stations for the wireless exchange of power to occur. In this regard, the positioning needed to land at a predefined home base or reference location in the property may be less precise than with a contact based charging station. Based on the robotic devices landing at a wireless charging station, the wireless charging station outputs a wireless signal that the robotic devices receive and convert to a power signal that charges a battery maintained on the robotic devices.

In some implementations, each of the robotic devices has a corresponding and assigned charging station such that the number of robotic devices equals the number of charging stations. In these implementations, the robotic devices always navigate to the specific charging station assigned to that robotic device. For instance, a first robotic device may always use a first charging station and a second robotic device may always use a second charging station.

In some examples, the robotic devices may share charging stations. For instance, the robotic devices may use one or more community charging stations that are capable of charging multiple robotic devices. The community charging station may be configured to charge multiple robotic devices in parallel. The community charging station may be configured to charge multiple robotic devices in serial such that the multiple robotic devices take turns charging and, when fully charged, return to a predefined home base or reference location in the property that is not associated with a charger. The number of community charging stations may be less than the number of robotic devices.

Also, the charging stations may not be assigned to specific robotic devices and may be capable of charging any of the robotic devices. In this regard, the robotic devices may use any suitable, unoccupied charging station when not in use. For instance, when one of the robotic devices has completed an operation or is in need of battery charge, the monitoring system control unit 410 references a stored table of the occupancy status of each charging station and instructs the robotic device to navigate to the nearest charging station that is unoccupied.

The system 400 further includes one or more virtual reality devices 480. The one or more virtual reality devices 480 may include any type of device allowing a user to immerse themselves in an environment that simulates a physical presence in one or more places. For instance, the one or more virtual reality devices 480 may include an input/output interface that allows a user to interact with the environment. The one or more virtual reality devices 480 may include output devices for providing sensory experience to the user, such as displays and speakers, and input devices for controlling one or more aspects of the experience based on user input, such as sensors and mechanical controls (e.g., buttons). For example, the one or more virtual reality devices 480 may include one or more wearable virtual reality head-mounted displays or headsets that may be worn by a user.

In some implementations, the one or more virtual reality devices 480 may simulate a physical presence in one or more places located within or around a property monitored by system 400. The one or more virtual reality devices 480 may provide a user with this experience by communicating with one or more components of system 400, such as sensors 420, module 422, and camera 430. For instance, a user may be able to view a live feed from camera 430 on a display of a virtual reality headset 480 worn by the user. In some implementations, the virtual reality headset 480 may monitor data from one or more accelerometers included in the virtual reality headset 480 and control panning, tilting, and/or zooming functions of camera 430 based on the user's head movements. This may allow for synchronous movement of camera 430 and the virtual reality headset 480 as positioned on the user's head, which may provide the user with the sensation of physical presence within the area monitored by camera 430. The virtual reality headset 480 may provide one or more control signals to camera 430 such that it tilts and pans with movement of the user's head. Zoom functions of camera 430 may be controlled in accordance with leaning movements of the user's head. In some implementations, the virtual reality headset 480 may determine a positioning of the user's head in three-dimensional space and control movement of camera 430 along each axis in accordance with Denavit-Hartenberg parameters.

In some implementations, the virtual reality headset 480 may control zoom functions of camera 430 based on the user's eye movements as detected by a camera integral with the virtual reality headset 480. In these implementations, the virtual reality headset 480 may determine that the user's eyes are focused on a particular portion of its display and/or object depicted in an image of its display and, in response, provide camera 430 with the control signals necessary to zoom into the user's area of interest. In these implementations, the virtual reality device 480 may "lock-onto" an object included in images provided by camera 430 in response to determining that the user has shown a relatively high degree of interest in the object. For instance, the virtual reality device 480 may identify one or more objects included in the images of camera 430 and track the user's gaze to determine if the user's eyes have consistently followed one of the identified objects. The virtual reality headset 480 may control camera 430 such that it continuously tracks these objects of interest.

In some examples, the one or more virtual reality devices 480 may simulate a physical navigation of one or more places located within or around the property monitored by system 400. For instance, if the property includes multiple cameras 430, a virtual reality headset 480 may seamlessly transition from feed-to-feed to simulate a traversal of an area monitored by a series of cameras 430. The user may be able to pan, tilt, and zoom each camera 430, as described above, as well as "walk" through the environment using one or more directional controls provided by head movement or tactile input, for example. That is, the virtual reality headset 480 may coordinate movements of cameras 430 and the feed provided for display for the user, based on the user's movements, directional input, and the location of each camera 430, to simulate movement and translate the user's vantage point. For example, this may allow a user to investigate a potential threat on their property from a remote location. When utilized in combination with the "lock-on" feature described above, a user may be able to follow a moving object located within or around the property.

In some implementations, the system 400 includes one or more three-dimensional scanners or one or more depth sensors. In these implementations, the one or more virtual reality devices 480 may be able to provide the user with a three-dimensional simulation of one or more areas of their property. When utilized in combination with the techniques described above in association with cameras 430, the user may be able to interact with three-dimensional renderings of objects on the property. In some implementations, data from the one or more three-dimensional scanners or one or more depth sensors may be utilized to model an environment, while data from one or more cameras 430 may be utilized to texturize the models generated. This may provide the user with a very realistic experience, allowing them to quickly and accurately identify and assess threats. In some implementations, the three-dimensional or depth information is gleaned from data provided by one or more sensors 420 and/or cameras 430.

The one or more virtual reality devices 480 may also provide virtual instructions to the user. For instance, the one or more virtual reality devices 480 may help guide the user through one or more installation processes associated with system 400. The one or more virtual reality devices 480 may communicate with a remotely-located technician, who will be able to receive a view of the user's home and provide instruction accordingly. For example, a technician may be able to see what the user is seeing and augment the display of their virtual reality headset 480 with one or more images to provide a demonstration for the user and assist with system configuration, installation, and/or maintenance.

The one or more virtual reality devices 480 may include one or more cameras, one or more proximity sensors, one or more gyroscopes, one or more accelerometers, one or more magnetometers, a global positioning system (GPS) unit, an altimeter, one or more sonar or laser sensors, one or more motion sensors, one or more accelerometers, one or more buttons or other mechanical controls, one or more microphones, and/or any other types of sensors. Furthermore, the one or more virtual reality devices 480 may receive input from any of sensors 420.

The sensors 420, the module 422, the camera 430, the thermostat 434, and the virtual reality devices 480 communicate with the controller 412 over communication links 424, 426, 428, 432, 484, and 486. The communication links 424, 426, 428, 432, 484, and 486 may be a wired or wireless data pathway configured to transmit signals from the sensors 420, the module 422, the camera 430, the thermostat 434, and the virtual reality devices 480 to the controller 412. The sensors 420, the module 422, the camera 430, the thermostat 434, and the virtual reality devices 480 may continuously transmit sensed values to the controller 412, periodically transmit sensed values to the controller 412, or transmit sensed values to the controller 412 in response to a change in a sensed value.

The communication links 424, 426, 428, 432, 484, and 486 may include a local network. The sensors 420, the module 422, the camera 430, the thermostat 434, and the virtual reality devices 480 and the controller 412 may exchange data and commands over the local network. The local network may include 802.11 "WiFi" wireless Ethernet (e.g., using low-power WiFi chipsets), Z-Wave, Zigbee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring application server 460 is an electronic device configured to provide monitoring services by exchanging electronic communications with the monitoring system control unit 410, the one or more user devices 440, 450, and the central alarm station server 470 over the network 405. For example, the monitoring application server 460 may be configured to monitor events (e.g., alarm events) generated by the monitoring system control unit 410. In this example, the monitoring application server 460 may exchange electronic communications with the network module 414 included in the monitoring system control unit 410 to receive information regarding events (e.g., alarm events) detected by the monitoring system control unit 110. The monitoring application server 460 also may receive information regarding events (e.g., alarm events) from the one or more user devices 440, 450.

In some examples, the monitoring application server 460 may route alarm data received from the network module 414 or the one or more user devices 440, 450 to the central alarm station server 470. For example, the monitoring application server 460 may transmit the alarm data to the central alarm station server 470 over the network 405.

The monitoring application server 460 may store sensor and image data received from the monitoring system and perform analysis of sensor and image data received from the monitoring system. Based on the analysis, the monitoring application server 460 may communicate with and control aspects of the monitoring system control unit 410 or the one or more user devices 440, 450.

The central alarm station server 470 is an electronic device configured to provide alarm monitoring service by exchanging communications with the monitoring system control unit 410, the one or more mobile devices 440, 450, and the monitoring application server 460 over the network 405. For example, the central alarm station server 470 may be configured to monitor alarm events generated by the monitoring system control unit 410. In this example, the central alarm station server 470 may exchange communications with the network module 414 included in the monitoring system control unit 410 to receive information regarding alarm events detected by the monitoring system control unit 410. The central alarm station server 470 also may receive information regarding alarm events from the one or more mobile devices 440, 450 and/or the monitoring application server 460.

The central alarm station server 470 is connected to multiple terminals 472 and 474. The terminals 472 and 474 may be used by operators to process alarm events. For example, the central alarm station server 470 may route alarm data to the terminals 472 and 474 to enable an operator to process the alarm data. The terminals 472 and 474 may include general-purpose computers (e.g., desktop personal computers, workstations, or laptop computers) that are configured to receive alarm data from a server in the central alarm station server 470 and render a display of information based on the alarm data. For instance, the controller 412 may control the network module 414 to transmit, to the central alarm station server 470, alarm data indicating that a sensor 420 detected a door opening when the monitoring system was armed. The central alarm station server 470 may receive the alarm data and route the alarm data to the terminal 472 for processing by an operator associated with the terminal 472. The terminal 472 may render a display to the operator that includes information associated with the alarm event (e.g., the name of the user of the alarm system, the address of the building the alarm system is monitoring, the type of alarm event, etc.) and the operator may handle the alarm event based on the displayed information.

In some implementations, the terminals 472 and 474 may be mobile devices or devices designed for a specific function. Although FIG. 4 illustrates two terminals for brevity, actual implementations may include more (and, perhaps, many more) terminals.

The one or more user devices 440, 450 are devices that host and display user interfaces. For instance, the user device 440 is a mobile device that hosts one or more native applications (e.g., the native surveillance application 442). The user device 440 may be a cellular phone or a non-cellular locally networked device with a display. The user device 440 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 440 may perform functions unrelated to the monitoring system, such as placing personal telephone calls, playing music, playing video, displaying pictures, browsing the Internet, maintaining an electronic calendar, etc.

The user device 440 includes a native surveillance application 442. The native surveillance application 442 refers to a software/firmware program running on the corresponding mobile device that enables the user interface and features described throughout. The user device 440 may load or install the native surveillance application 442 based on data received over a network or data received from local media. The native surveillance application 442 runs on mobile devices platforms, such as iPhone, iPod touch, Blackberry, Google Android, Windows Mobile, etc. The native surveillance application 442 enables the user device 440 to receive and process image and sensor data from the monitoring system.

The user device 450 may be a general-purpose computer (e.g., a desktop personal computer, a workstation, or a laptop computer) that is configured to communicate with the monitoring application server 460 and/or the monitoring system control unit 410 over the network 405. The user device 450 may be configured to display a surveillance monitoring user interface 452 that is generated by the user device 450 or generated by the monitoring application server 460. For example, the user device 450 may be configured to display a user interface (e.g., a web page) provided by the monitoring application server 460 that enables a user to perceive images captured by the camera 430 and/or reports related to the monitoring system. Although FIG. 4 illustrates two user devices for brevity, actual implementations may include more (and, perhaps, many more) or fewer user devices.

In some implementations, the one or more user devices 440, 450 communicate with and receive monitoring system data from the monitoring system control unit 410 using the communication link 438. For instance, the one or more user devices 440, 450 may communicate with the monitoring system control unit 410 using various local wireless protocols such as WiFi, Bluetooth, Zwave, Zigbee, HomePlug (Ethernet over powerline), or wired protocols such as Ethernet and USB, to connect the one or more user devices 440, 450 to local security and automation equipment. The one or more user devices 440, 450 may connect locally to the monitoring system and its sensors and other devices. The local connection may improve the speed of status and control communications because communicating through the network 405 with a remote server (e.g., the monitoring application server 460) may be significantly slower.

Although the one or more user devices 440, 450 are shown as communicating with the monitoring system control unit 410, the one or more user devices 440, 450 may communicate directly with the sensors and other devices controlled by the monitoring system control unit 410. In some implementations, the one or more user devices 440, 450 replace the monitoring system control unit 410 and perform the functions of the monitoring system control unit 410 for local monitoring and long range/offsite communication.

In other implementations, the one or more user devices 440, 450 receive monitoring system data captured by the monitoring system control unit 410 through the network 405. The one or more user devices 440, 450 may receive the data from the monitoring system control unit 410 through the network 405 or the monitoring application server 460 may relay data received from the monitoring system control unit 410 to the one or more user devices 440, 450 through the network 405. In this regard, the monitoring application server 460 may facilitate communication between the one or more user devices 440, 450 and the monitoring system.

In some implementations, the one or more user devices 440, 450 may be configured to switch whether the one or more user devices 440, 450 communicate with the monitoring system control unit 410 directly (e.g., through link 438) or through the monitoring application server 460 (e.g., through network 405) based on a location of the one or more user devices 440, 450. For instance, when the one or more user devices 440, 450 are located close to the monitoring system control unit 410 and in range to communicate directly with the monitoring system control unit 410, the one or more user devices 440, 450 use direct communication. When the one or more user devices 440, 450 are located far from the monitoring system control unit 410 and not in range to communicate directly with the monitoring system control unit 410, the one or more user devices 440, 450 use communication through the monitoring application server 460.

Although the one or more user devices 440, 450 are shown as being connected to the network 405, in some implementations, the one or more user devices 440, 450 are not connected to the network 405. In these implementations, the one or more user devices 440, 450 communicate directly with one or more of the monitoring system components and no network (e.g., Internet) connection or reliance on remote servers is needed.

In some implementations, the one or more user devices 440, 450 are used in conjunction with only local sensors and/or local devices in a house. In these implementations, the system 400 only includes the one or more user devices 440, 450, the sensors 420, the module 422, the camera 430, and the robotic devices. The one or more user devices 440, 450 receive data directly from the sensors 420, the module 422, the camera 430, and the robotic devices and sends data directly to the sensors 420, the module 422, the camera 430, and the robotic devices. The one or more user devices 440, 450 provide the appropriate interfaces/processing to provide visual surveillance and reporting.

In other implementations, the system 400 further includes network 405 and the sensors 420, the module 422, the camera 430, the thermostat 434, and the robotic devices are configured to communicate sensor and image data to the one or more user devices 440, 450 over network 405 (e.g., the Internet, cellular network, etc.). In yet another implementation, the sensors 420, the module 422, the camera 430, the thermostat 434, and the robotic devices (or a component, such as a bridge/router) are intelligent enough to change the communication pathway from a direct local pathway when the one or more user devices 440, 450 are in close physical proximity to the sensors 420, the module 422, the camera 430, the thermostat 434, and the robotic devices to a pathway over network 405 when the one or more user devices 440, 450 are farther from the sensors 420, the module 422, the camera 430, the thermostat 434, and the robotic devices. In some examples, the system leverages GPS information from the one or more user devices 440, 450 to determine whether the one or more user devices 440, 450 are close enough to the sensors 420, the module 422, the camera 430, the thermostat 434, and the robotic devices to use the direct local pathway or whether the one or more user devices 440, 450 are far enough from the sensors 420, the module 422, the camera 430, the thermostat 434, and the robotic devices that the pathway over network 405 is required. In other examples, the system leverages status communications (e.g., pinging) between the one or more user devices 440, 450 and the sensors 420, the module 422, the camera 430, the thermostat 434, and the robotic devices to determine whether communication using the direct local pathway is possible. If communication using the direct local pathway is possible, the one or more user devices 440, 450 communicate with the sensors 420, the module 422, the camera 430, the thermostat 434, and the robotic devices using the direct local pathway. If communication using the direct local pathway is not possible, the one or more user devices 440, 450 communicate with the sensors 420, the module 422, the camera 430, the thermostat 434, and the robotic devices using the pathway over network 405.

In some implementations, the system 400 provides end users with access to images captured by the camera 430 to aid in decision making. The system 400 may transmit the images captured by the camera 430 over a wireless WAN network to the user devices 440, 450. Because transmission over a wireless WAN network may be relatively expensive, the system 400 uses several techniques to reduce costs while providing access to significant levels of useful visual information.

In some implementations, a state of the monitoring system and other events sensed by the monitoring system may be used to enable/disable video/image recording devices (e.g., the camera 430). In these implementations, the camera 430 may be set to capture images on a periodic basis when the alarm system is armed in an "Away" state, but set not to capture images when the alarm system is armed in a "Stay" state or disarmed. In addition, the camera 430 may be triggered to begin capturing images when the alarm system detects an event, such as an alarm event, a door opening event for a door that leads to an area within a field of view of the camera 430, or motion in the area within the field of view of the camera 430. In other implementations, the camera 430 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

The invention claimed is:

1. A monitoring system, comprising:
one or more processors; and
one or more storage devices that include instructions that are operable, when executed by the one or more processors, to cause the one or more processors to perform operations comprising:
detecting an occurrence of an event at a property;
based on detecting the event:
determining, based on sensor data generated by one or more sensors, that an occupant of the property is immersed in a virtual reality environment, wherein determining that the occupant of the property is immersed in a virtual reality environment comprises:
analyzing the sensor data to determine one or more characteristics of the occupant; and
based on (i) the determined one or more characteristics and (ii) the detected event at the property, determining that the occupant of the property is immersed in a virtual reality environment;
and,
based on determining that the occupant of the property is immersed in the virtual reality environment, generating an alert notification that, when processed by another device, causes the device to perform one or more operations that initiate the occupant's emergence from the virtual reality environment.

2. The monitoring system of claim 1, the operations further comprising:
transmitting the generated alert notification to the other device.

3. The monitoring system of claim 1, the operations further comprising:
detecting an occurrence of a different event at the property;
based on detection of the different event:
obtaining second sensor data;
determining, based on the obtained second sensor data, that the occupant of the property is immersed in the virtual reality environment, wherein determining that the occupant of the property is immersed in the virtual reality environment comprises:
analyzing the second sensor data to determine one or more characteristics of the occupant; and
based on (i) the determined one or more characteristics determined based on the second sensor data and (ii) the detected different event at the property, determining that the occupant of the property is immersed in the virtual reality environment;
determining an importance score for the detected different event;
determining that the importance score for the detected different event satisfies a predetermined threshold; and
based on determining that the importance score for the detected different event satisfies the predetermined threshold, generating the alert notification for transmission to the other device.

4. The monitoring system of claim 3, the operations further comprising:
detecting the occurrence of the different event at the property;
based on detection of the different event:
obtaining the second sensor data;
determining, based on the obtained second sensor data, that the occupant of the property is immersed in the virtual reality environment, wherein determining that the occupant of the property is immersed in the virtual reality environment comprises:
analyzing the second sensor data to determine one or more characteristics of the occupant; and
based on (i) the determined one or more characteristics determined based on the second sensor data and (ii) the detected different event at the property, determining that the occupant of the property is immersed in a virtual reality environment;
determining the importance score for the detected different event;
determining that the importance score for the detected different event does not satisfy the predetermined threshold; and
based on determining that the importance score for the detected different event does not satisfy the predetermined threshold, determining not to generate the alert notification for transmission to the other device.

5. The monitoring system of claim 1, wherein the other device includes a virtual reality headset.

6. The monitoring system of claim 1, wherein the other device includes a wearable device that is worn by the occupant of the property.

7. The monitoring system of claim 1, wherein the one or more sensors include one or more sensors of the monitoring system, the one or more sensors of the monitoring system comprising at least one of a motion sensor, a camera, or a thermometer.

8. The monitoring system of claim 1, wherein the one or more sensors include one or more sensors of one or more wearable devices worn by the occupant of the property, the one or more sensors of the one or more wearable devices including a heart rate sensor, a breathing rate sensor, or a temperature sensor.

9. A method comprising:
detecting an occurrence of an event at a property;
based on detecting the event:
determining, based on sensor data generated by one or more sensors, that an occupant of the property is immersed in a virtual reality environment, wherein determining that the occupant of the property is immersed in a virtual reality environment comprises:
analyzing the sensor data to determine one or more characteristics of the occupant; and
based on (i) the determined one or more characteristics and (ii) the detected event at the property, determining that the occupant of the property is immersed in a virtual reality environment;
and,
based on determining that the occupant of the property is immersed in the virtual reality environment, generating an alert notification that, when processed by another device, causes the device to perform one or more operations that initiate the occupant's emergence from the virtual reality environment.

10. The method of claim 9, the method further comprising:
transmitting the generated alert notification to the other device.

11. The method of claim 9, the method further comprising:
detecting an occurrence of a different event at the property;
based on detection of the different event:
obtaining second sensor data;
determining, based on the obtained second sensor data, that the occupant of the property is immersed in the virtual reality environment, wherein determining that the occupant of the property is immersed in the virtual reality environment comprises:
analyzing the second sensor data to determine one or more characteristics of the occupant; and
based on (i) the determined one or more characteristics determined based on the second sensor data and (ii) the detected different event at the property, determining that the occupant of the property is immersed in the virtual reality environment;
determining an importance score for the detected different event;
determining that the importance score for the detected different event satisfies a predetermined threshold; and
based on determining that the importance score for the detected different event satisfies the predetermined threshold, generating the alert notification for transmission to the other device.

12. The method of claim 9, the method further comprising:
detecting an occurrence of a different event at the property;
based on detection of the different event:
obtaining second sensor data;
determining, based on the obtained second sensor data, that the occupant of the property is immersed in the virtual reality environment, wherein determining that the occupant of the property is immersed in the virtual reality environment comprises:
analyzing the second sensor data to determine one or more characteristics of the occupant; and
based on (i) the determined one or more characteristics determined based on the second sensor data and (ii) the detected different event at the property, determining that the occupant of the property is immersed in the virtual reality environment;
determining an importance score for the detected different event;
determining that the importance score for the detected different event does not satisfy a predetermined threshold; and
based on determining that the importance score for the detected different event does not satisfy the predetermined threshold, determining not to generate the alert notification for transmission to the other device.

13. The method of claim 9, wherein the one or more sensors include one or more sensors of a monitoring system, the one or more sensors of the monitoring system comprising at least one of a motion sensor, a camera, or a thermometer.

14. The method of claim 9, wherein the one or more sensors include one or more sensors of one or more wearable devices worn by the occupant of the property, the one or more sensors of the one or more wearable devices including a heart rate sensor, a breathing rate sensor, or a temperature sensor.

15. A non-transitory computer-readable storage device having stored thereon instructions, which, when executed by a data processing apparatus, cause the data processing apparatus to perform operations comprising:
detecting an occurrence of an event at a property;
based on detecting the event:
determining, based on sensor data generated by one or more sensors, that an occupant of the property is immersed in a virtual reality environment, wherein determining that the occupant of the property is immersed in a virtual reality environment comprises:
analyzing the sensor data to determine one or more characteristics of the occupant; and
based on (i) the determined one or more characteristics and (ii) the detected event at the property, determining that the occupant of the property is immersed in a virtual reality environment;
and,
based on determining that the occupant of the property is immersed in the virtual reality environment, generating an alert notification that, when processed by another device, causes the device to perform one or more operations that initiate the occupant's emergence from the virtual reality environment.

16. The computer-readable storage device of claim 15, the operations further comprising:
transmitting the generated alert notification to the other device.

17. The computer-readable storage device of claim 15, the operations further comprising:
detecting an occurrence of a different event at the property;
based on detection of the different event:
obtaining second sensor data;
determining, based on the obtained second sensor data, that the occupant of the property is immersed in the virtual reality environment, wherein determining that the occupant of the property is immersed in the virtual reality environment comprises:
analyzing the second sensor data to determine one or more characteristics of the occupant; and
based on (i) the determined one or more characteristics determined based on the second sensor data and (ii) the detected different event at the property, determining that the occupant of the property is immersed in the virtual reality environment;
determining an importance score for the detected different event;
determining that the importance score for the detected different event satisfies a predetermined threshold; and
based on determining that the importance score for the detected different event satisfies the predetermined threshold, generating the alert notification for transmission to the other device.

18. The computer-readable storage device of claim 15, the operations further comprising:
detecting an occurrence of a different event at the property;
based on detection of the different event:
obtaining second sensor data;
determining, based on the obtained second sensor data, that the occupant of the property is immersed in the virtual reality environment, wherein determining that the occupant of the property is immersed in the virtual reality environment comprises:
analyzing the second sensor data to determine one or more characteristics of the occupant; and
based on (i) the determined one or more characteristics determined based on the second sensor data and (ii) the detected different event at the property, determining that the occupant of the property is immersed in the virtual reality environment;

determining an importance score for the detected different event;

determining that the importance score for the detected different event does not satisfy a predetermined threshold; and based on determining that the importance score for the detected different event does not satisfy the predetermined threshold, determining not to generate the alert notification for transmission to the other device.

19. The computer-readable storage device of claim 15, wherein the one or more sensors include one or more sensors of a monitoring system, the one or more sensors of the monitoring system comprising at least one of a motion sensor, a camera, or a thermometer.

20. The computer-readable storage device of claim 15, wherein the one or more sensors include one or more sensors of one or more wearable devices worn by the occupant of the property, the one or more sensors of the one or more wearable devices including a heart rate sensor, a breathing rate sensor, or a temperature sensor.

* * * * *